Patented Aug. 28, 1945

2,383,800

UNITED STATES PATENT OFFICE 2,383,800

METAL CLEANING COMPOSITION AND PROCESS

Aaron D. Johnson, Brecksville, Ohio, assignor to E. I. du Pont de Nemours & Company, Wilmington, Del., a corporation of Delaware No Drawing. Application April 23, 1942, Serial No. 440,207

7 Claims. (Cl. 252—100)

This invention relates to the cleaning of metals and is more particularly directed to processes in which a metal to be cleaned is subjected to the action of an acidic solution containing a residue from the fermentation of a soluble carbohydrate to lactic acid, the residue to acid ratio being greater than the residue to lactic acid ratio directly obtainable by such fermentation, and is further directed to the acidic cleaning compositions employed.

Lactic acid has already been used as a cleaning agent in uses where its character as a weak organic acid gives especial advantages. In this capacity commercial grades of lactic acid have been employed, and it has been considered that the pure, lighter grades were to be preferred and grades containing dark residues from the fermentation process were to be avoided.

When lactic acid is prepared by the fermentation of soluble carbohydrates such as starch or molasses, there is present in the fermentation acid so obtained a considerable amount of dissolved or dispersed dark residue. Numerous methods have been devised and employed for cutting down or eliminating this dark residue in order to produce a more acceptable grade of acid, and accordingly most commercial grades, even those known as "dark lactic acid" have undergone at least some slight purification aimed at reducing the quantity of dark residue present.

According to the present invention, it has been found that when lactic acid is to be used for cleaning metals, it is desirable that the content of dark fermentation residue be increased rather than decreased and that such residues may be used with acids other than lactic acid to inhibit the corrosive action of such acids on metals. To control adequately the action of acids on metals, the dark fermentation residue should be present in appreciable amounts, best results being obtained when the ratio of residue to acid is greater than the residue: lactic acid ratio obtained in crude fermentation lactic acid.

Control of the action of acids on metals obtained by adding lactic acid dark fermentation residue is extremely effective. Advantageous use of this effectiveness may be made in metal pickling practice such as in the removal of mill scale from hot-rolled steel sheets. The merit of the compositions and processes of this invention is particularly pronounced, however, in connection with practices wherein the metal being treated is one, such as cast iron, which is especially susceptible to corrosion in acids. Cleaning operations, such as the removal of hard water scale from the cooling jackets of engine blocks of internal combustion engines, which have hitherto been considered impracticable because of corrosion of the metal by acid cleaning solutions, become entirely feasible according to the practices of this invention.

The action of acids on metals is controlled according to this invention by having present an effective concentration of a dark lactic acid fermentation residue. The controlling agents used are referred to as "residues" mainly because they are present in the crude lactic acid remaining after a portion of relatively pure acid has been extracted out or otherwise separated from the fermentation acid obtained by suitable fermentation of a soluble carbohydrate. It will be understood that such residues may be and usually are entirely water-soluble and may be associated with lactic acid.

A fermentation residue for use in this invention may be obtained by any of the conventional methods for making lactic acid with which the art is already familiar. Such a method is described, for instance, in Riegel's "Industrial Chemistry" (1933) at page 321. Thus, lactic acid may be formed by the action of Bacterium lactis acidi on molasses or other sugar-containing material. The sugar-containing material is diluted and chalk and a nutritive solution are added, and the action is allowed to take place at 40–45° C. As fast as the lactic acid is formed, it reacts with the chalk to form calcium lactate with the evolution of carbon dioxide. Chalk must be used because the bacteria become inactive if the concentration of the acid rises above one per cent. The calcium lactate precipitates and is filtered, washed and treated with dilute sulfuric acid which liberates the lactic acid in solution form. There is thus obtained an acid, hereinafter referred to as "fermentation acid," containing dark impurities. This solution is concentrated, the concentration usually being carried to the point where the solution contains either 22 or 44% lactic acid and the product thus obtained being usually referred to as 22 or 44% "dark lactic acid." From dark lactic acid a fraction of a purer acid may be removed as for instance by extraction with organic solvents such as ethers, isopropyl ether as disclosed in Jenemann U. S. Patent 1,906,068 being especially suitable. The solution remaining after such extraction contains substantially all the impurities of the original aqueous solution together with about 20% of the total lactic acid charged. Such solutions are hereinafter referred to as "spent" lactic acid.

According to the present invention, there is used for cleaning metals acid solutions containing dark residues from lactic acid fermentation such as exist in the spent lactic acid above described. The spent lactic acid may be used as such, or it may be diluted with another acid, or the dark residues may be further concentrated and extracted as by means of solvents, and the concentrated residues may be added to other acids. When lactic acid is substantially the only acid present, it is necessary that the ratio of dark residue to acid be greater than that which exists in the straight-fermentation acid.

The acid used with the dark fermentation residue will of course depend to a large extent on the particular cleaning problem involved and upon economic considerations. There may be used, for instance, mineral acids such as sulfuric, hydrochloric, hydrofluoric, or fluosilicic, organic acids such as acetic, propionic, oxalic, citric, or tartaric, or there may be used inorganic or organic salts capable of producing such acids by hydrolysis in aqueous solution. Combinations of acids may in some cases be employed to particular advantage.

The acid compositions of this invention containing dark lactic acid fermentation residues may also contain conventional metal pickling inhibitors such as thioureas, especially diorthotolyl thiourea or dicyclohexylthiourea, derivatives of nitrogen bases such as pyridine, piperidine, or pipyridine, or sulfurized materials such as sulfurized quinoidine. The compositions may also contain wetting and dispersing agents, solubility promoters, and foaming agents.

In using a composition of this invention for cleaning purposes, the object to be cleaned is subjected to the action of the cleaning composition for a period of time sufficient at least to loosen the deposit which it is desired to remove. This action may be facilitated by agitation or by heating the cleaning solution. For instance, in the pickling of steel sheets the sheets may be placed in a cradle and slowly raised and lowered in the cleaning solution at a temperature between about 140° F. and the boiling point of the solution. In the treatment of internal combustion engine blocks to remove hard water scale from the jackets the solution may be pumped through the jacket at elevated temperatures.

Illustrative of this invention is the particular composition and its use in a metal cleaning process shown in the following example.

*Example*

A cleaning composition was made up by mixing 44.25 parts by weight of an 18° Bé. commercial hydrochloric acid, 55.25 parts by weight of a spent lactic acid solution obtained as above described as the residue from the ether extraction of a fermentation lactic acid produced from starch, and 0.5 part by weight of oxalic acid. This spent lactic acid solution contained 22% by weight of lactic acid, the balance being water and dark residues from the fermentation procedure.

This cleaning composition was used for removing an accumulation of hard, refractory hard water scale from the water jackets of an internal combustion engine in the following manner:

A tank was connected through a pump to the water inlet of the jacket at the bottom of the engine and a return line to the tank was connected to the overflow of the water outlet at the top of the engine. A quantity of the cleaning solution was placed in the tank, heated to 140° F., and caused to circulate through the engine by means of the pump for four hours. Inspection of the water jackets at the end of this time showed them to be free of scale and also showed that the attack on the cast iron by the acid had been negligible. When replaced in service, the engine was found to have its original cooling efficiency.

In the foregoing example there is disclosed a composition particularly adapted for the removal of hard water scale from corrodible metal. It will be understood that the constituents used and their proportions may be varied considerably without departing from the scope of this invention.

The dark residue used to control the action of the acid on metal may be obtained by the fermentation of a soluble carbohydrate with a suitable lactobacillus. In place of the starch of the above example sugar-containing juices, such as molasses may be employed. With the purer grades of corn starch a nutrient for the lactobacillus may be used such as, for instance, corn germ meal cake, peptones, glue, or soluble nitrogen compounds such as urea. The dark residue so obtained may be concentrated by the evaporation of water, solvent extraction either of the dark material or of the pure lactic acid, formation of salts of lactic acid followed by fractional crystallization, or by other means capable of increasing the proportion of dark residue to the lactic acid present.

The dark residues from lactic acid fermentation may be used with or without another acid, but in any event, the ratio of residue to lactic acid should be greater than that existing in a fermentation lactic acid. For removing hard water scale from internal combustion engine water jackets, compositions containing from 10 to 90% by weight of 18° Bé. hydrochloric acid, from 90 to 10% of spent lactic acid such as obtained as a residue from an isopropyl ether extraction process such as described in Jenemann Patent 1,906,068 and from about 0.25 to 2.0 parts of oxalic acid are preferred, compositions in this range giving a maximum rate of scale dissolution with a minimum rate of metal corrosion.

Compositions of this invention have a wide range of applicability in addition to the uses above described. Thus, the solutions may be used for various cleaning purposes, for the pickling of metals to remove rust, scale and other corrosion deposits, for removing calcareous deposits, such as for removing scale from boiling tubes and for treating oil wells to increase their flow, and in other such processes in which acid solutions came into contact, directly or indirectly, with corrodible metals.

While in the foregoing description of this invention particular compositions and processes are set forth, it will be understood that without departing from the spirit of the invention one skilled in the art may employ numerous compositions and processes.

I claim:

1. A composition adapted for removing deposits from acid-corrodible metals comprising about from 10 to 90 parts by weight of 18° Bé. hydrochloric acid and from 90 to 10 parts of a spent lactic acid obtained as the residue from the solvent extraction of fermentation lactic acid.

2. A composition adapted for removing deposits from acid-corrodible metals comprising about 10 to 90 parts by weight of 18° Bé. hydrochloric acid, from 90 to 10 parts of a spent lactic acid obtained as the residue from the solvent extraction of a fermentation lactic acid, and from about 0.25 to 2.0 parts of oxalic acid 3. A composition adapted for removing deposits from acid-corrodible metals comprising about 44.25 parts by weight of 18° Bé. hydrochloric acid and 55.24 parts of spent 22% lactic acid obtained as the residue from the solvent extraction of fermentation lactic acid.

4. A composition adapted for removing deposits from acid-corrodible metals comprising about 44.25% by weight of 18° Bé. hydrochloric acid, 55.25% of spent 22% lactic acid obtained as the residue from the solvent extraction of fermentation lactic acid, and 0.5% oxalic acid.

5. In a process for removing hard water scale from metal water jackets of internal combustion engines, the step comprising subjecting the scale in contact with the metal to the action of a solution comprising about 44.25% by weight of 18° Bé. muriatic acid, 55.25% spent 22% lactic acid obtained as the residue from the solvent extraction of fermentation lactic acid, and 0.5% oxalic acid, at a temperature from about 140° F. to the boiling point of the solution and for a time sufficient to effect dissolution of the scale.

6. In a process for dissolving a calcareous deposit in the presence of an acid-corrodible metal, the steps comprising immersing the deposit and metal in a solution comprising about from 10 to 90 parts by weight of 18° Bé. hydrochloric acid, from 90 to 10 parts of a spent lactic acid obtained as a residue from the solvent extraction of a fermentation lactic acid, and from about .25 to 2.0 parts of oxalic acid, maintaining the solution in contact with the deposit for a time sufficient to permit dissolution of the deposit in the solution, and removing the solution from contact with the metal.

7. In a process for dissolving a calcareous deposit in the presence of an acid-corrodible metal, the steps comprising immersing the deposit and metal in a solution comprising about 44.25% by weight of 18° Bé. muriatic acid, 55.25% spent 22% lactic acid obtained as the residue from the solvent extraction of fermentation lactic acid, and 0.5% oxalic acid, maintaining the solution in contact with the deposit for a time sufficient to permit dissolution of the deposit in the solution, and removing the solution from contact with the metal.

AARON D. JOHNSON.